(12) United States Patent
Tomita

(10) Patent No.: US 7,598,972 B2
(45) Date of Patent: Oct. 6, 2009

(54) OPTICAL SCANNING DEVICE AND IMAGE FORMING APPARATUS

(75) Inventor: Yasumasa Tomita, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 168 days.

(21) Appl. No.: 11/496,523

(22) Filed: Aug. 1, 2006

(65) Prior Publication Data

US 2007/0030333 A1 Feb. 8, 2007

(30) Foreign Application Priority Data

Aug. 3, 2005 (JP) ............................. 2005-225004

(51) Int. Cl.
*B41J 2/435* (2006.01)
*B41J 2/47* (2006.01)

(52) U.S. Cl. ...................... 347/235; 347/250

(58) Field of Classification Search ................ 347/115, 347/231, 243, 259–261, 244, 229, 234–235, 347/248–250
See application file for complete search history.

(56) References Cited

U.S. PATENT DOCUMENTS

| 5,107,280 | A | 4/1992 | Ohashi et al. |
| 6,856,335 | B2 * | 2/2005 | Ono ........................... 347/115 |
| 6,914,620 | B2 * | 7/2005 | Yoshida et al. ............... 347/235 |
| 7,038,194 | B2 | 5/2006 | Tomita |
| 7,158,165 | B2 * | 1/2007 | Kato ........................... 347/244 |
| 7,436,425 | B2 * | 10/2008 | Yamazaki et al. ........... 347/244 |
| 2002/0039132 | A1 | 4/2002 | Hayashi et al. |
| 2002/0195552 | A1 | 12/2002 | Ueda |
| 2004/0169716 | A1 | 9/2004 | Serizawa et al. |
| 2006/0055769 | A1 * | 3/2006 | Yamazaki et al. ........... 347/243 |
| 2006/0139440 | A1 | 6/2006 | Tomita |

FOREIGN PATENT DOCUMENTS

| EP | 1 296 172 A1 | 9/2002 |
| JP | 2003-098454 | 4/2003 |
| JP | 2004-219770 | 8/2004 |
| JP | 2004-271763 | 9/2004 |

OTHER PUBLICATIONS

European Patent Office Action dated Nov. 8, 2006, for corresponding European Patent Application No. 06253971.3-2217.

* cited by examiner

*Primary Examiner*—Hai C Pham
(74) *Attorney, Agent, or Firm*—Harness, Dickey & Pierce, PLC

(57) ABSTRACT

A deflecting unit deflects a light beam emitted by each of a plurality of light-beam emitting units independently to scan surfaces of different bodies to be scanned. Each of a plurality of light-receiving units receives the deflected light beam at a predetermined position in a direction of the deflection. An incident angle of the deflected light beam with respect to a scanning line extending in a direction of scanning on a light-receiving surface of the light-receiving unit is set to be identical for all of the light-receiving units.

9 Claims, 13 Drawing Sheets

OPTICAL SCANNING DEVICE AND IMAGE FORMING APPARATUS

CROSS-REFERENCE TO RELATED APPLICATIONS

The present document incorporates by reference the entire contents of Japanese priority document, 2005-225004 filed in Japan on Aug. 3, 2005.

BACKGROUND OF THE INVENTION

1. Field of the Invention

The present invention relates to an optical scanning device that deflects light beams emitted from a plurality of beam-emitting units independently thereby scanning surfaces of different objects to be scanned, and that includes a light-receiving unit for receiving each of the deflected scanning beams at a predetermined position in the direction of deflection.

2. Description of the Related Art

Conventionally, optical scanning devices are widely used in digital image forming apparatuses. The optical scanning devices include a beam-emitting unit and a beam-deflecting unit. The beam-emitting unit includes a laser diode or the like and emits a light beam. The beam-deflecting unit is, for example, a polygon mirror that rotates or an oscillating mirror that oscillates back and forth. The beam-deflecting unit deflects the light beam emitted from the beam-emitting unit, applying the beam to a photoconductor, thereby optically scanning a surface of the photoconductor. The light beam is deflected so that the beam spot it forms on the surface of the photoconductor can move in a direction that is substantially at right angles to the direction in which the photoconductor moves. The direction in which the beam spot moves on the surface of the photoconductor is known as a main-scanning direction. If the photoconductor does not move at all, the light beam will only repeatedly scan the surface of the photoconductor, along the same line extending at right angles to the direction in which the photoconductor is moved. Since the surface of the photoconductor moves substantially at right angles to the main-scanning direction, the beam scans the photoconductor also in this direction. This direction (the direction in which the latent-image carrier moves) is known as sub-scanning direction. As the surface of the photoconductor is scanned in both the main-scanning direction and the subs-scanning direction, an electrostatic latent image is written on the photoconductor. The electrostatic latent image thus written is developed into a visible image by a developing unit that is incorporated in the image forming apparatus.

Optical scanning devices that perform optical scanning to accomplish so-called tandem image formation are known, as disclosed in, for example, Japanese Patent Application Laid-open No. 2003-98454 and Japanese Patent Application Laid-open No. 2004-271763. The tandem image formation is an image forming method in which electronic photographing is performed, forming visible images in parallel on the surfaces of photoconductors. The visible images are transferred from the photoconductors onto a transfer-recording medium and thereby superimposed one on another, thus providing a multi-color image. In the optical scanning devices disclosed in Japanese Patent Application Laid-open No. 2003-98454 and Japanese Patent Application Laid-open No. 2004-271763, light beams emitted from the beam-emitting units are deflected independently and scan different photoconductors, respectively. That is, the photoconductors are scanned in parallel. In this parallel scanning, a reflection mirror provided at one end of the scanning line reflects the light beams. A light-receiving unit, such as a light-receiving element, receives the light beam thus reflected and generates sync signals from the light beams. Timings of driving the beam-emitting units are determined from the sync signals. According to the timings thus determined, the timings of driving the beam-emitting units are adjusted, thereby minimizing the mutual displacement of the visible images on the transfer-recording medium.

Even if the timings of driving the beam-emitting units are so adjusted, the displacement of the visible images cannot be sufficiently reduced in some cases. The present inventors conducted an intensive research to find out why the displacement cannot be reduced sufficiently. The research has revealed the following. As shown in FIG. 15, a light-receiving sensor 200 includes a light-receiving surface 201 that is wider than the diameter of a laser beam L. The laser beam L, which is emitted from a photodiode or the like, is deflected by a beam-deflecting unit (not shown) such as a polygon mirror. As the laser beam L thus deflected moves over the light-receiving surface 201 in the direction of the arrow (scanning direction), it is detected by the light-receiving sensor 200.

The photosensitivity that the light-receiving sensor 200 has with respect to the laser beam L differs, depending on the incident angle of the laser beam L, even if the laser beam L remains unchanged in intensity. For example, the light-receiving sensor 200 exhibits relatively high photosensitivity to the laser beam L that is applied almost perpendicular to the light-receiving surface 201, or at an incident angle that is nearly equal to 0°, as shown in FIG. 16. The light-receiving sensor 200 such output-voltage characteristic as is shown in FIG. 17. As shown in FIG. 17, the greater the amount of light the light-receiving sensor 200 receives, the higher the output voltage of the light-receiving sensor 200. At the moment the light-receiving sensor 200 starts receiving the laser beam L moving in the scanning direction, only a part of the beam spot illuminates the light-receiving surface 201. Hence, the output voltage of the light-receiving sensor 200 gradually falls at a slope, as shown in FIG. 17, when the light-receiving sensor 200 starts receiving the laser beam L. Some time later the output voltage is stabilized at the minimum value. The output voltage falls relatively fast because the laser beam L is applied almost perpendicular to the light-receiving surface 201. At a time t1 when the voltage falls below a preset threshold value, the light-receiving sensor 200 is considered to have received the laser beam L. The output the light-receiving sensor 200 generates at this time is used as a sync signal in the control unit of the optical scanning device.

By contrast, the light-receiving sensor 200 has relatively low photosensitivity to the laser beam L applied to the light-receiving surface 201, much inclined thereto, as is shown in FIG. 18. In this case, when the light-receiving sensor 200 starts receiving the laser beam L, the output voltage falls as shown in FIG. 19, more slowly than in the case that the laser beam L is applied perpendicular to the light-receiving surface 201. A sync signal is therefore generated at a time t2, some time after the time t1. Consequently, sync signals will be detected at different times if the laser beams L for respective color images are applied at different incident angles. The phases of these sync signals cannot be detected with high accuracy, which makes it difficult to minimize the displacement of visible images.

SUMMARY OF THE INVENTION

It is an object of the present invention to at least partially solve the problems in the conventional technology.

An optical scanning device according to one aspect of the present invention includes a plurality of light-beam emitting units each of which emitting a light beam; a deflecting unit that deflects the light beam emitted by each of the light-beam emitting units independently to scan surfaces of different bodies to be scanned; and a plurality of light-receiving units each of which receiving the deflected light beam at a predetermined position in a direction of the deflection. An incident angle of the deflected light beam with respect to a scanning line extending in a direction of scanning on a light-receiving surface of the light-receiving unit is set to be identical for all of the light-receiving units.

An image forming apparatus according to another aspect of the present invention includes a plurality of photoconductors for forming a latent image; an optical scanning device that optically scans the photoconductors independently, to form latent images on the photoconductors; a developing unit that develops the latent images formed on the photoconductors independently; and a transfer unit that transfers visible images obtained on the photoconductors by developing the latent images to a transfer medium in a superimposing manner. The optical scanning device includes a plurality of light-beam emitting units each of which emitting a light beam; a deflecting unit that deflects the light beam emitted by each of the light-beam emitting units independently to scan surfaces of different bodies to be scanned; and a plurality of light-receiving units each of which receiving the deflected light beam at a predetermined position in a direction of the deflection. An incident angle of the deflected light beam with respect to a scanning line extending in a direction of scanning on a light-receiving surface of the light-receiving unit is set to be identical for all of the light-receiving units.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained in detail below with reference to the accompanying drawings.

Figure 1:
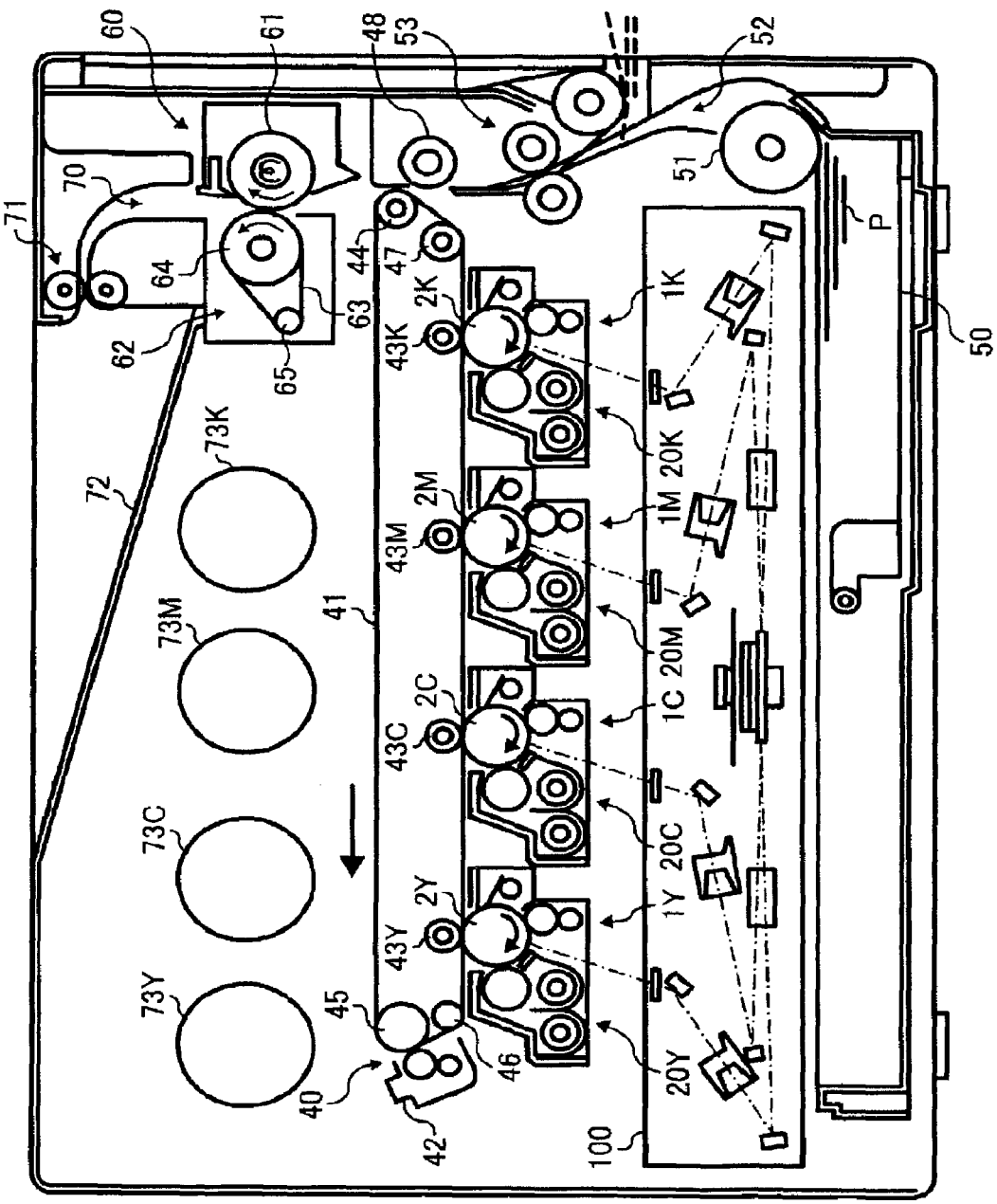
FIG. 1 is a schematic configuration diagram of a printer according to an embodiment of the present invention.
Figure 2:
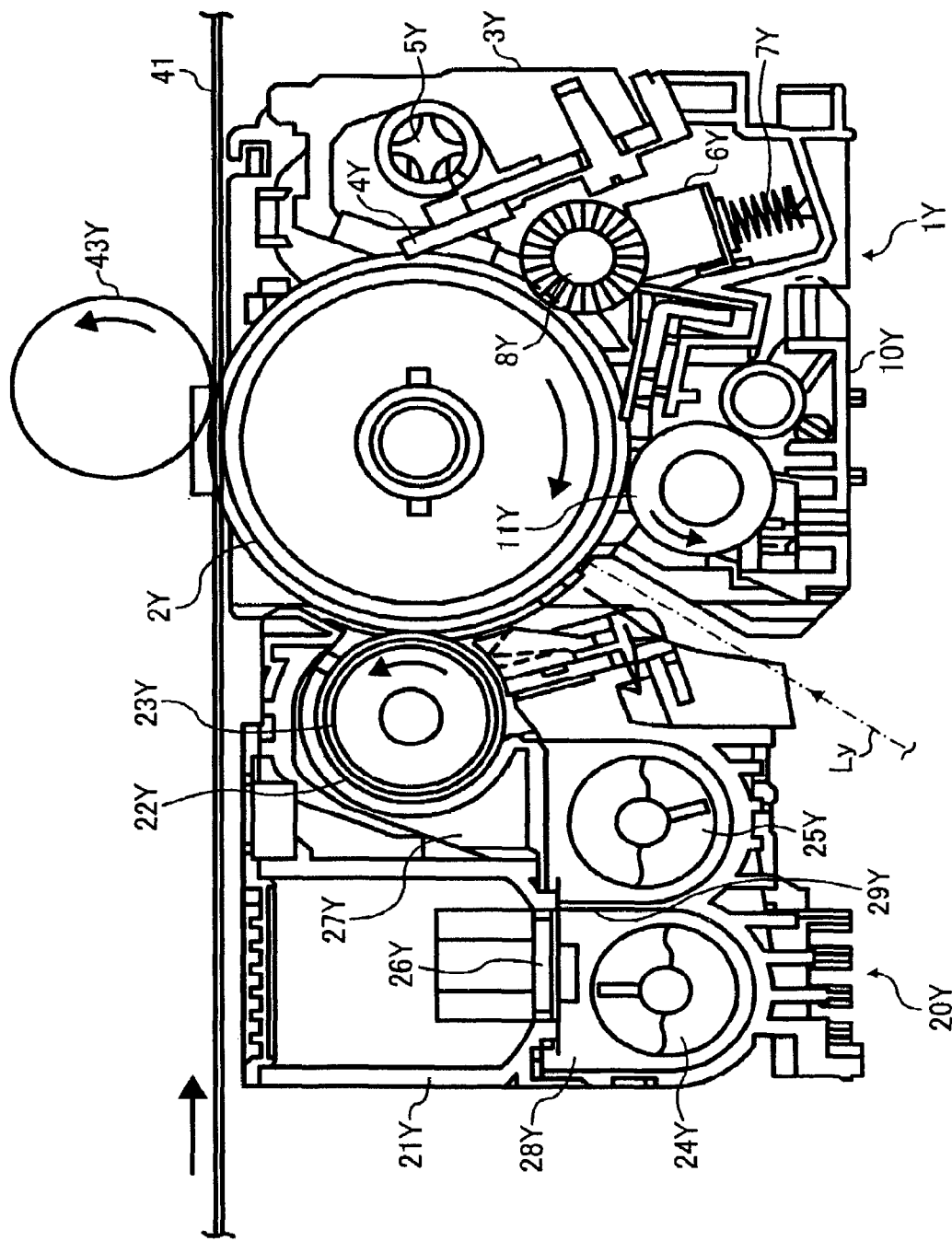
FIG. 2 is an enlarged configuration diagram of a process unit and a developing unit, both for Y used in the printer.

FIG. 1 is a schematic configuration diagram of an electronic-photographic-type printer (hereinafter, "a printer"). As shown in FIG. 1, the printer includes process cartridges 1Y, 1C, 1M, and 1K and developing units 20Y, 20C, 20M, and 20K. The process cartridges 1Y, 1C, 1M, and 1K contain yellow toner, cyan toner, magenta toner, and black toner, respectively. The developing units 20Y, 20C, 20M, and 20K are used to develop yellow images, cyan images, magenta images, and black images, respectively. Nonetheless, the four cartridges are of the same configuration, and so are the four developing units 20Y, 20C, 20M, and 20K. They are replaced by new ones when their lifetime expires. The process cartridge 1Y containing Y toner, for example, includes a drum-shaped photoconductor 2Y, a drum cleaning unit 3Y, a discharging lamp (not shown), a charger 10Y, and the like. The developing unit 20Y using the Y toner, for example, includes a casing 21Y, a developing sleeve 22Y, a magnet roller 23Y, a first supply screw 24Y, a second supply screw 25Y, a toner-concentration sensor 26Y, and the like.

In the casing 21Y of the developing unit 20Y, the developing sleeve 22Y shaped like a hollow cylinder is rotatably arranged, having a circumferential part exposed through an opening made in the casing 21Y. The magnet roller 23Y includes a plurality magnetic poles that are spaced apart in the circumferential direction. The magnet roller 23Y is fixed in the developing sleeve 22Y so that it does not rotate when the developing sleeve 22Y rotates. In the casing 21Y, a toner-stirring/supplying unit 28Y is provided below a developing unit 27Y that includes the developing sleeve 22Y and the magnet roller 23Y. The developing unit 27Y contains Y developer (not shown) containing a magnetic carrier and the Y toner. The toner-stirring/supplying unit 28Y is divided by a partition wall 29Y into a first supplying unit and a second supplying unit. The first supplying unit holds the first supply screw 24Y. The second supplying unit holds the second supply screw 25Y. The partition wall 29Y includes an opening (not shown) positioned at the opposing ends of the supply screws 24Y and 25Y. Although this opening, the first and second supplying units communicate with each other.

The first supply screw 24Y provided in the first supplying unit is driven by a drive unit (not shown). As it is driven, the first supply screw 24Y stirs the Y toner and supplies the same in the first supplying unit, from the front to the rear in a direction perpendicular to the plane of FIG. 1. The Y toner thus fed by the first supply screw 24Y to the rear part of the developing unit 20Y passes through the opening (not shown) of the partition wall 29Y and enters the second supplying unit, reaching a position near the rear part thereof.

In the second supplying unit, the second supply screw 25Y stirs the Y toner and supplies the same in the first supplying unit the rear to the front, in a direction perpendicular to the plane of FIG. 1, as it is driven by a drive unit (not shown). As the Y developer is so stirred and fed in the second supplying unit, a part of the Y developer is applied onto the surface of the developing sleeve 22Y that rotates in the counterclockwise direction (in FIG. 1), by virtue of the magnetic force generated by the toner-applying magnetic poles (not shown) of the magnet roller 23Y. The remaining part of the Y developer, which has not been applied onto the developing sleeve 22Y, is fed a position near the front end of (in FIG. 1) the second supplying unit as the second supplying screw 25Y rotates. This part of the Y developer then enters the first supplying unit through the opening (not shown) of the partition wall 29Y. Thus, the toner undergoes frictional charging in the toner-stirring/supplying unit 28Y, while it is being fed back and forth between the first and second supplying units.

The Y developer applied by the developing sleeve 22Y forms a layer, whose thickness is regulated by a doctor blade 30Y that is opposed to the developing sleeve 22Y and spaced from the developing sleeve 22Y by a predetermined distance. As the developing sleeve 22Y rotates, the Y developer is transported to a developing region that is opposed to the photoconductor 2Y. The Y toner is applied to the electrostatic latent image formed on the photoconductor 2Y. The latent image is thereby developed into a Y-toner image. The Y developer passes over the developing region as the developing sleeve 22Y returns into the developing unit 27Y. It then enters the developing unit 27Y provided in the casing 21Y. The Y developer is influenced by the repulsion magnetic field generated by two magnetic poles which are provided on the magnet roller 23Y and which repel each other. As a result, the Y developer moves from the surface of the developing sleeve 22Y. The Y developer then returns into the second supplying unit of the toner-stirring/supplying unit 28Y.

The toner-concentration sensor 26Y that works as a permeability sensor is fixed on the top wall of the first supplying unit of the toner-stirring/supplying unit 28Y. The toner-concentration sensor 26Y outputs a voltage that corresponds to the permeability of the Y developer passing immediately under it. Any two-component developer that contains toner and magnetic carrier exhibits permeability that is correlated to the toner concentration to some extent. Hence, the voltage the toner-concentration sensor 26Y outputs a voltage according to the concentration of the Y toner. A signal representing the value of the output voltage is supplied to a toner-replenishing controller (not shown). The toner-replenishing controller includes a read only memory (RAM) that stores a target value Y-Vtref to the output voltage output by the toner-concentration sensor 26Y. The RAM also stores target values C-Vref, M-Vtref, and K-Vtref that are target values to the voltages output from the toner-concentration sensors mounted on the three other developing units. The target value Y-Vtref is used to control a Y-toner supplying unit (not shown). More specifically, the toner-replenishing controller drives and controls the Y-toner supplying unit, which supplies the Y toner into the first supplying unit of the toner-stirring/supplying unit 28Y so that the voltage output from the toner-concentration sensor 26Y can approach the target value Y-Vtref. Since the Y toner is so replenished, the concentration of the Y toner in the Y developer is maintained within a preset range. In the other developing units, the C-toner supplying unit, the M-toner supplying unit, and the K-toner supplying unit are controlled, thus replenishing C toner, M toner, and K toner, respectively.

In the process cartridge 1Y, the photoconductor 2Y is rotated clockwise in FIG. 1, by a drive unit (not shown). The charger 10Y uniformly charges the surface of the photoconductor 2Y thus rotated. The surface is then scanned with a laser beam Ly for forming a Y image. A Y electrostatic latent image is thereby formed on the photoconductor 2Y. The Y electrostatic latent Y image is developed into a Y toner image. The Y toner image is transferred onto an intermediate transfer belt 41, which will be explained later.

The drum cleaning unit 3Y includes a cleaning blade 4Y, a collection screw 5Y, a zinc stearate block 6Y, a spring 7Y, a coating brush 8Y, and the like. The distal end of the cleaning blade 4Y can abut on the photoconductor 2Y to remove the toner that lies on the surface of the photoconductor 2Y after the primary image-transfer step. The toner removed drops onto the collection screw 5Y. The collection screw 5Y rotates, supplying the toner to its one end. The toner is discharged through a discharge port (not shown) from the drum cleaning unit 3Y. The toner is then supplied into a waste toner bottle (not shown) and will be discarded. The coating brush 8Y is located downstream of the position where the cleaning blade 4Y abuts on the photoconductor 2Y, with respect to the direction in which the photoconductor 2Y rotates. The coating brush 8Y includes a shaft and filaments planted on the shaft. The coating brush 8Y rotates, while the filaments remain abutting on the photoconductor 2Y. The spring 7Y presses the zinc stearate block 6Y is pressed onto the coating brush 8Y. As it rotates the coating brush 8Y scrapes off the zinc stearate block 6Y and applies zinc stearate as lubricant to the surface of the photoconductor 2Y.

The discharging lamp (not shown) electrically discharges the surface of the photoconductor 2Y coated with the lubricant. The charger 10Y then uniformly charges the surface of the photoconductor 2Y. As shown in FIG. 1, the charger 10Y is a charging roller 11Y that is set in frictional contact on, or spaced apart from, the photoconductor 2Y, to electrically charge the photoconductor 2Y uniformly. Instead, the charger 10Y can be of corotron-type or scorotron-type.

As shown in FIG. 1, an optical scanning device 100 is arranged below the process cartridges 1Y, 1C, 1M, and 1K. The optical scanning device 100 is controlled by an optical writing circuit (not shown). The optical writing circuit controls the optical scanning device 100 based on image information sent from a personal computer (not shown) or the like.

The optical scanning device 100 optically scans the photoconductors provided in the process cartridges 1Y, 1C, 1M, and 1K, respectively, with laser beams generated corresponding to control signals supplied from the optical writing circuit. The optical scanning forms Y, C, M, and K electronic latent images on the photoconductors 2Y, 2C, 2M, and 2K, respectively. The optical scanning device 100 applies the laser beams to the photoconductors, each laser beam having been emitted from a laser oscillator, deflected by a polygon mirror driven by one motor, guided through a plurality of optical lenses and reflected by mirrors.

As shown in FIG. 1, a transfer unit 40 is arranged above the process cartridges 1Y, 1C, 1M, and 1K. The transfer unit 40 includes the intermediate transfer belt 41, i.e., endless belt that is stretched and serves as transfer member. The transfer unit 40 includes a cleaning unit 42, in addition to the intermediate transfer belt 41. The transfer unit 40 further includes four primary bias rollers 43Y, 43C, 43M, and 43K, a secondary transfer backup roller 44, a cleaning backup roller 45, a tension roller 46, a driven roller 47, and the like. The intermediate transfer belt 41 is wrapped around these eight rollers and is endlessly driven counterclockwise (in FIG. 1) as at least one of these rollers rotates. The primary bias rollers 43Y, 43C, 43M, and 43K hold the intermediate transfer belt 41, jointly with the photoconductors 2Y, 2C, 2M, and 2K, defining primary transfer nips. The primary bias rollers apply a transfer bias to the reverse side (inner side of the loop). The transfer bias (e.g., positive bias) is opposite in polarity to the toner. All rollers but the primary bias rollers 43Y, 43C, 43M, and 43K, are electrically grounded. As the intermediate transfer belt 41, i.e., an endless belt, passes through the primary transfer nips, a Y toner image, a C toner image, an M toner image, and a K toner image are transferred to it from the photoconductors 2Y, 2C, 2M, and 2K, respectively. Thus, four toner images of different colors are superimposed on the intermediate transfer belt 41, forming a toner image of four superimposed colors (hereinafter, "four-color toner image") on the intermediate transfer belt 41.

The eight rollers provided in the transfer unit 40 are arranged all within the loop defined by the intermediate transfer belt 41. Besides these eight rollers, the transfer unit 40 includes a secondary transfer roller 48. The secondary transfer roller 48 holds the intermediate transfer belt 41, jointly with the secondary transfer backup roller 44. The secondary transfer roller 48 and the secondary transfer backup roller 44 therefore form a secondary transfer nip. At the secondary transfer nip, a secondary transfer electric field is applied, which includes the secondary transfer bias applied to the secondary transfer roller 48 and the potential difference at the secondary transfer backup roller 44.

As shown in FIG. 1, a paper storage unit is arranged in the lower part of the optical scanning device 100. The paper storage unit includes a paper storage cassette 50 and a paper-feeding roller 51. The paper storage cassette 50 stores a stack of transfer paper P. The uppermost transfer paper P contacts the paper-feeding roller 51. When the paper-feeding roller 51 is rotated counterclockwise (in FIG. 1) by a drive unit (not shown), the uppermost transfer paper P is fed toward a sheet-feeding path 52.

Near the distal end of the sheet-feeding path 52, a pair of registration rollers 53 is arranged. The registration rollers 53 are both rotated to hold the transfer paper P. As soon as they hold the sheet P, they are stopped rotating. At an appropriate timing thereafter, they are rotated again, feeding the sheet P toward the secondary transfer nip mentioned above. The four toner images of different colors, formed on the intermediate transfer belt 14, are transferred altogether a time to the transfer paper P, one upon another, at the secondary transfer nip, by virtue of the secondary transfer electric field and the pressure applied at the secondary transfer nip. The four toner images superimposed one on another form a full-color toner image, jointly with the white surface of the transfer paper P. The transfer paper P is fed to a fixing unit 60. The fixing unit 60 fixes the full-color toner image on the transfer paper P.

The residual toner, i.e., toner not transferred to the transfer paper P, sticks to the surface of the intermediate transfer paper P that has passed through the secondary transfer nip. The residual toner is removed from the intermediate transfer belt 41 by the cleaning unit 42 that holds the intermediate transfer belt 41, jointly with the cleaning backup roller 45. The residual toner thus removed is supplied into the waste toner bottle.

The fixing unit 60 incorporates a heat source such as a halogen lamp and includes a fixing roller 61 and a fixing belt unit 62. The fixing roller 61 is rotated clockwise in FIG. 1. The fixing belt unit 62 cooperates with a pressure-applying roller 64 and a driven roller 65 to apply a tension on a fixing belt 63 that is an endless belt and drives the fixing belt 63 in the counterclockwise direction (in FIG. 1). The pressure-applying roller 64 and the fixing roller 61 abut on each other at a predetermined pressure, with the fixing belt 63 interposed between them. Thus, a fixing nip is provided, at which the fixing roller 61 contacts the obverse side of the fixing belt 63. The transfer paper P fed into the fixing unit 60 is held in the fixing nip, with its toner-image carrying surface set in contact with the fixing roller 61. The toner particles forming the toner image soften as they receive heat and pressure. As a result, the full-color image is fixed on the transfer paper P.

The transfer paper P on which the full-color image has been fixed in the fixing unit 60 is fed from the fixing unit 60. It is then fed through a sheet-inverting path 70 and a pair of sheet-discharge rollers 71. Finally, the sheet P is placed in a stacking unit 72 that is provided on the top surface of the printer housing.

A bottle-supporting unit is arranged between the transfer unit 40 and the stacking unit 72. The bottle-supporting unit supports toner bottles 73Y, 73C, 74M, and 73K that contain Y toner, C toner, M toner, and K toner, respectively. The Y toner, C toner, M toner, and K toner are supplied from the toner bottles 73Y, 73C, 74M, and 73K into the developing units 20Y, 20C, 20M, and 20K, respectively, by toner-supplying units (not shown) for each toner. The toner bottles 73Y, 73C, 74M, and 73K are removably secured to the main unit of the printer, independently of the process cartridges 1Y, 1C, 1M, and 1K.

Figure 3:
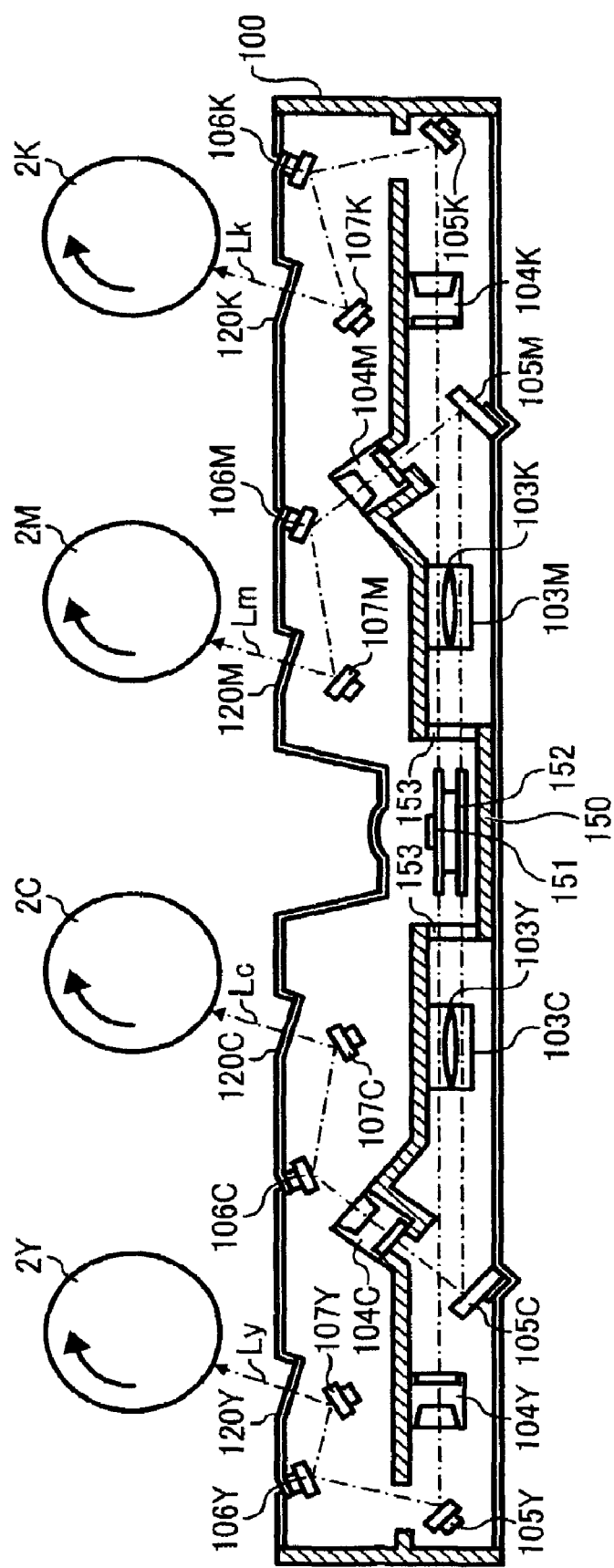
FIG. 3 is an enlarged configuration diagram of an optical scanning device and four photoconductors used in the printer.

FIG. 3 is an enlarged configuration diagram of the optical scanning device 100, depicting the four photoconductors 2Y, 2C, 2M, and 2K. The optical scanning device 100 includes a rotary mirror unit 150, various reflection mirrors, various lenses, and the like. The rotary mirror unit 150 is arranged immediately below a midpoint between the second and third of the four photoconductors 2Y, 2C, 2M, and 2K arranged from the left in the order mentioned. Namely, the rotary mirror unit 150 lies between the photoconductor 2C and the photoconductor 2M. The rotary mirror unit 150 includes an upper polygon mirror 151 and a lower polygon mirror 152, which are secured to a motor shaft of a polygon mirror (not shown). These polygon mirrors are a regular hexahedron each, having six reflecting faces. They are secured to the motor shaft of the motor, which extends vertically, and are aligned in the vertical direction. The upper polygon mirror 151 is located above the lower polygon mirror 152. The polygon mirrors are regular hexahedrons of the same size. The polygon mirrors are secured to the motor shaft, one polygon mirror having a rotation phase shifted from that of the other polygon mirror. The rotary mirror unit 150 thus configured is surrounded by a soundproof glass 153.

Figure 4:
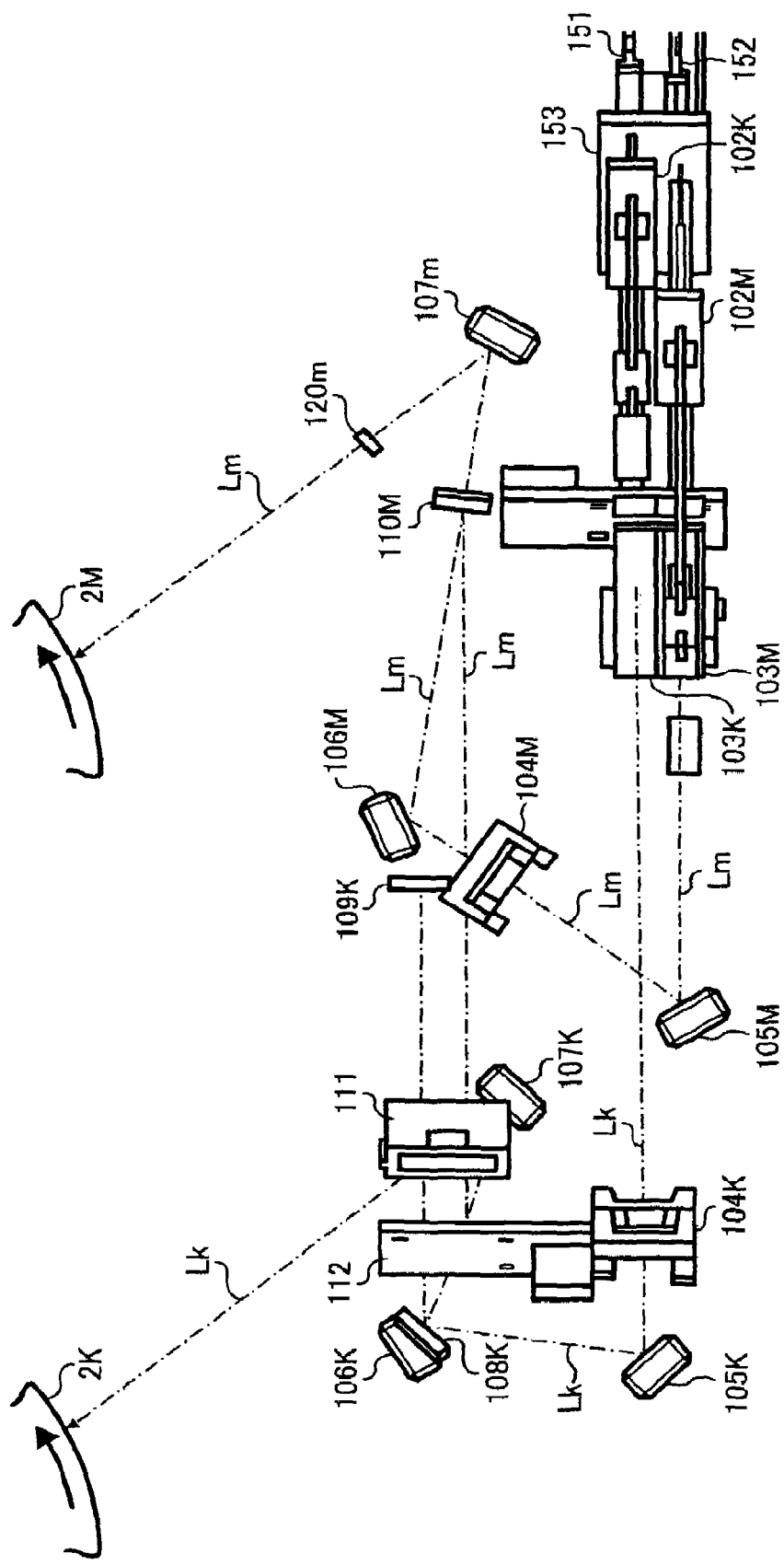
FIG. 4 is an enlarged configuration diagram of an optical system for M and an optical system for K in the optical scanning device.

In the optical scanning device 100, an optical system for M and an optical system for K are arranged on the right side of the rotary mirror unit 150 as is shown in FIG. 3. FIG. 4 is an enlarged configuration diagram of these two optical systems. FIG. 4 depicts the optical scanning device 100 as viewed from one side, while FIG. 3 depicts the optical scanning device 100 as viewed from the opposite side.

In the optical system for K, a laser beam Lk emitted from a laser oscillator (not shown), i.e., a beam-emitting unit, passes through the cylindrical lens for K. The laser beam Lk then passes through the soundproof glass 153 and enters the interior of the rotary mirror unit 150. The laser beam Lk is reflected by any one of the six reflecting faces of the upper polygon mirror 151 that is driven and rotated. At this time, the reflected angle of the laser beam Lk for K gradually changes as the reflection face rotates around the motor shaft. The optical path of the laser beam Lk for K is thereby deflected in the main-scanning direction. Reflected by the reflecting face of the upper polygon mirror 151, the laser beam Lk for K passes again through the soundproof glass 153 and emerges from the rotary mirror unit 150. The laser beam Lk then passes first although a first scanning lens 103K for K and then through a second scanning lens 104K for K. The laser beam Lk is then reflected by a first reflection mirror 105K for K, a second reflection mirror 106K for K, and a third reflection mirror 107K for K. Finally, the laser beam Lk reaches the photoconductor 2K for K via a dustproof glass 120K for K that is provided on the top wall of the casing of the optical scanning device 100.

In the optical system for M, a laser beam Lm emitted from a laser diode (not shown) for m passes through a cylindrical lens 102m for M and then through the soundproof glass 153 and enters the interior of the rotary mirror unit 150. The laser beam Lm is reflected by any one of the six reflecting faces of the lower polygon mirror 152 that is driven and rotated. At this time, the reflected angle of the laser beam Lm for M gradually changes as the reflection face rotates around the motor shaft. The optical path of the laser beam Lm for M is thereby deflected in the main-scanning direction. Reflected by the reflecting face of the lower polygon mirror 152, the laser beam Lm for M passes again through the soundproof glass 153 and emerges from the rotary mirror unit 150. The laser beam Lm then passes although a first scanning lens 103M for M and is reflected by the surface of the first reflection mirror 105M for M. The laser beam Lm then passes through a second scanning lens 104M for M. The laser beam Lm is further reflected by a second reflection mirror 106M for M and a third reflection mirror 107M for M. Finally, the laser beam Lm reaches the photoconductor 2M for M via a dustproof glass 120M for M that is provided on the top wall of the casing of the optical scanning device 100.

As shown in FIG. 3, an optical system for Y and an optical system for C are provided on the left side of the rotary mirror unit 150. The optical system for Y is symmetrical to the optical system for C, with respect to a point through which the axis of the polygon motor shaft passes. Further, the optical system for C is symmetrical to the optical system for M, with respect to a point through which the axis of the polygon motor shaft passes.

Figure 5:
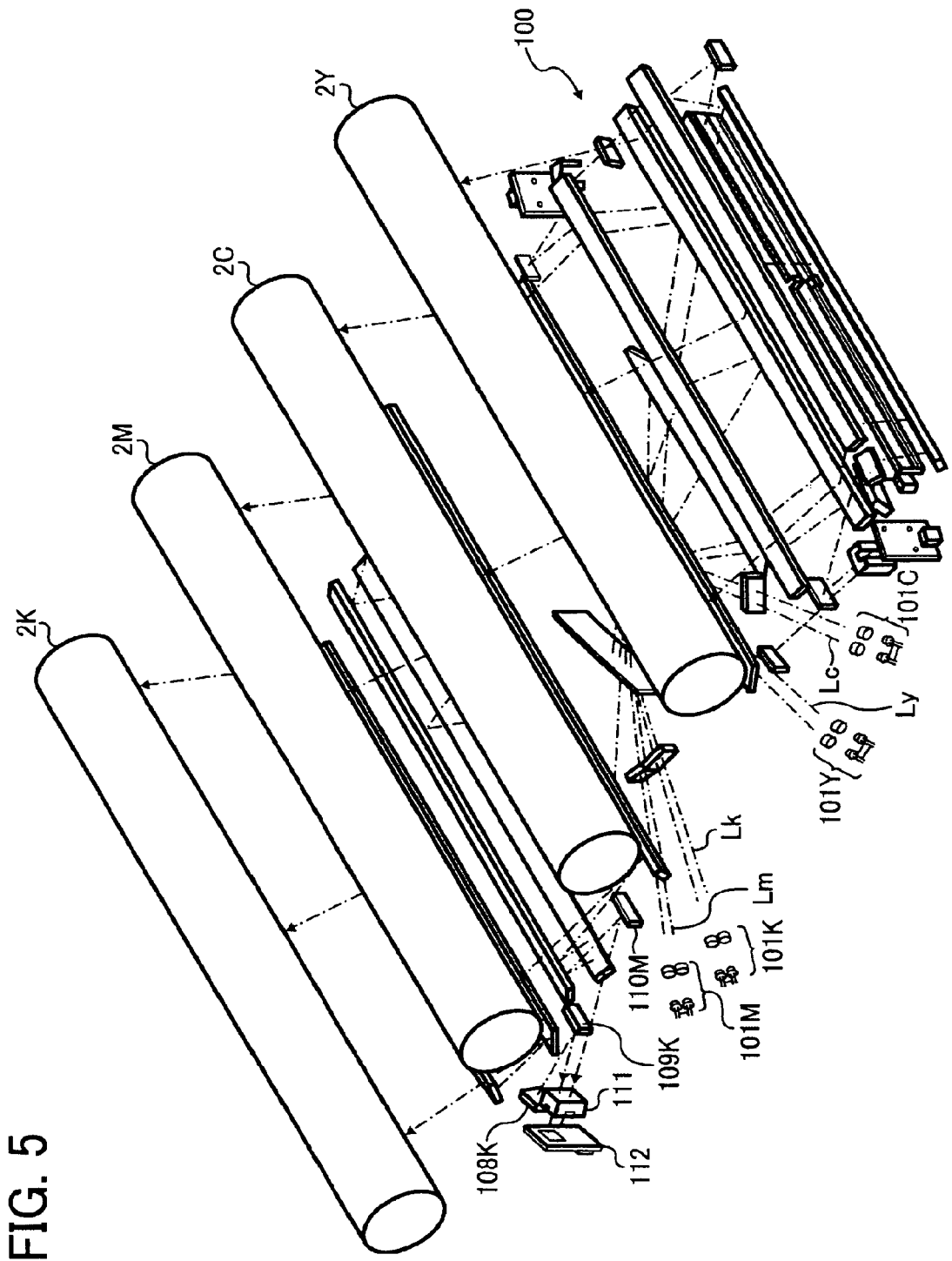
FIG. 5 is a perspective view of the four photoconductors and the optical scanning device, as viewed obliquely from above.

FIG. 5 is a perspective view of the four photoconductors 2Y, 2C, 2M, and 2K and the optical scanning device 100, as they are viewed obliquely from above. In the direction in which the four photoconductors 2Y, 2C, 2M, and 2K are arranged, the photoconductor 2Y for Y is located at the front panel of this printer. In the axial direction of the photoconductors, the left-side panel and right-side panel of the printer housing lie on the left side and right side of FIG. 5, respectively. In the optical scanning device 100, laser oscillators 101C, 101Y, 101K, and 101M respectively for C, Y, K, and M are arranged near the left-side panel of the printer housing. Each of these laser oscillators 101 includes two laser diodes that are arranged in the main-scanning direction and therefore emits two laser beams at the same time. Hence, in this printer, two dot latent images can be formed every time any laser oscillator 101 is driven. Hereinafter, a set of laser beams simultaneously emitted and arranged side by side in the scanning direction is referred to as multi-beam. In this printer, a multi-beam including two laser beams is optically written on a photoconductor to form a one-color image. In FIG. 5 and the following figures, each multi-beam is indicated, as needed, by a one-dot dashed line. Although the beams emitted for Y, C, M, and K are multi-beams, each including two laser beams, they will be called laser beams Ly, Lc, Lm, and Lk, for the sake of convenience.

Figure 6:
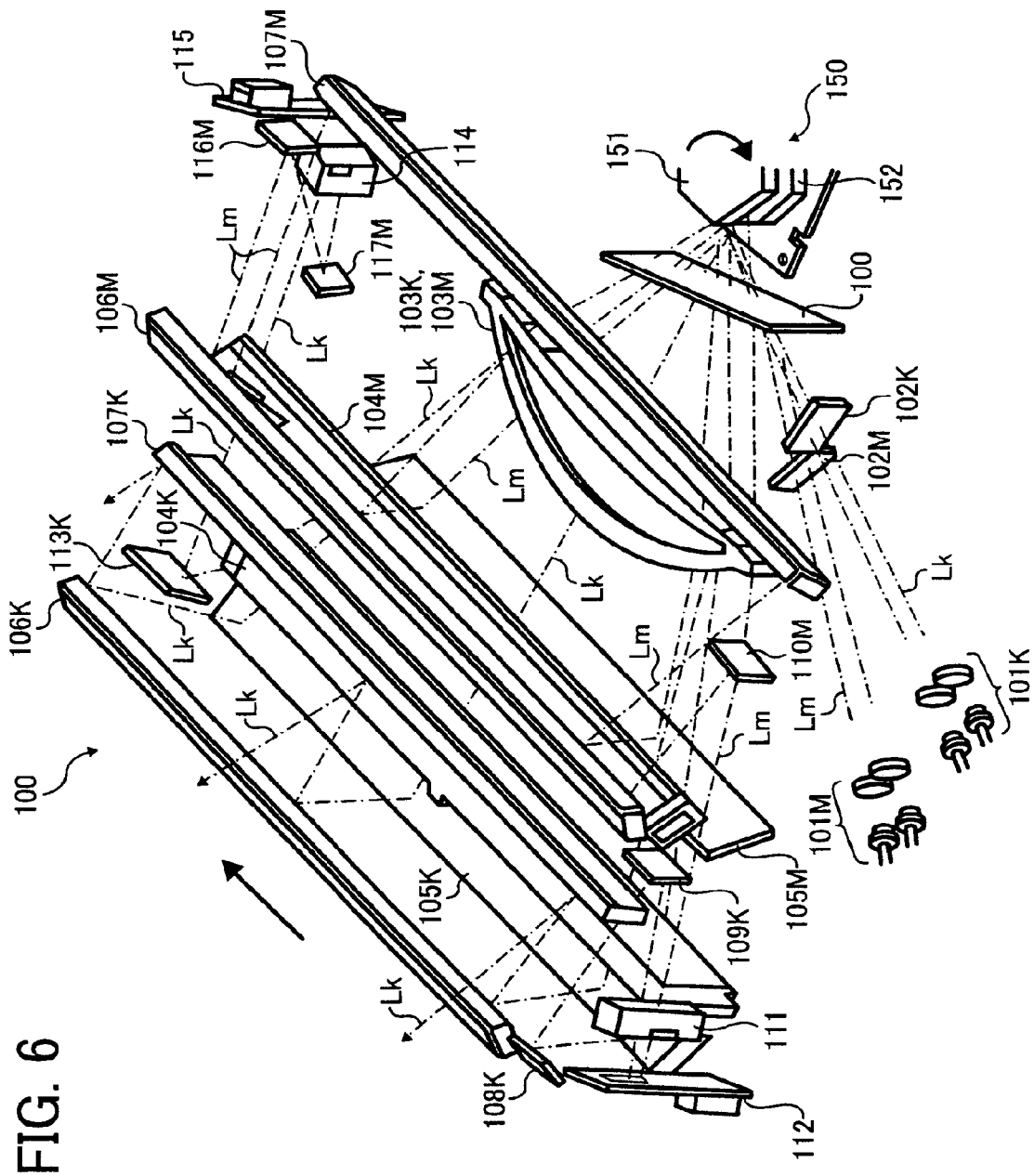
FIG. 6 is a perspective view of the optical system for M and the optical system for K used in the optical scanning device, as viewed from above.
Figure 7:
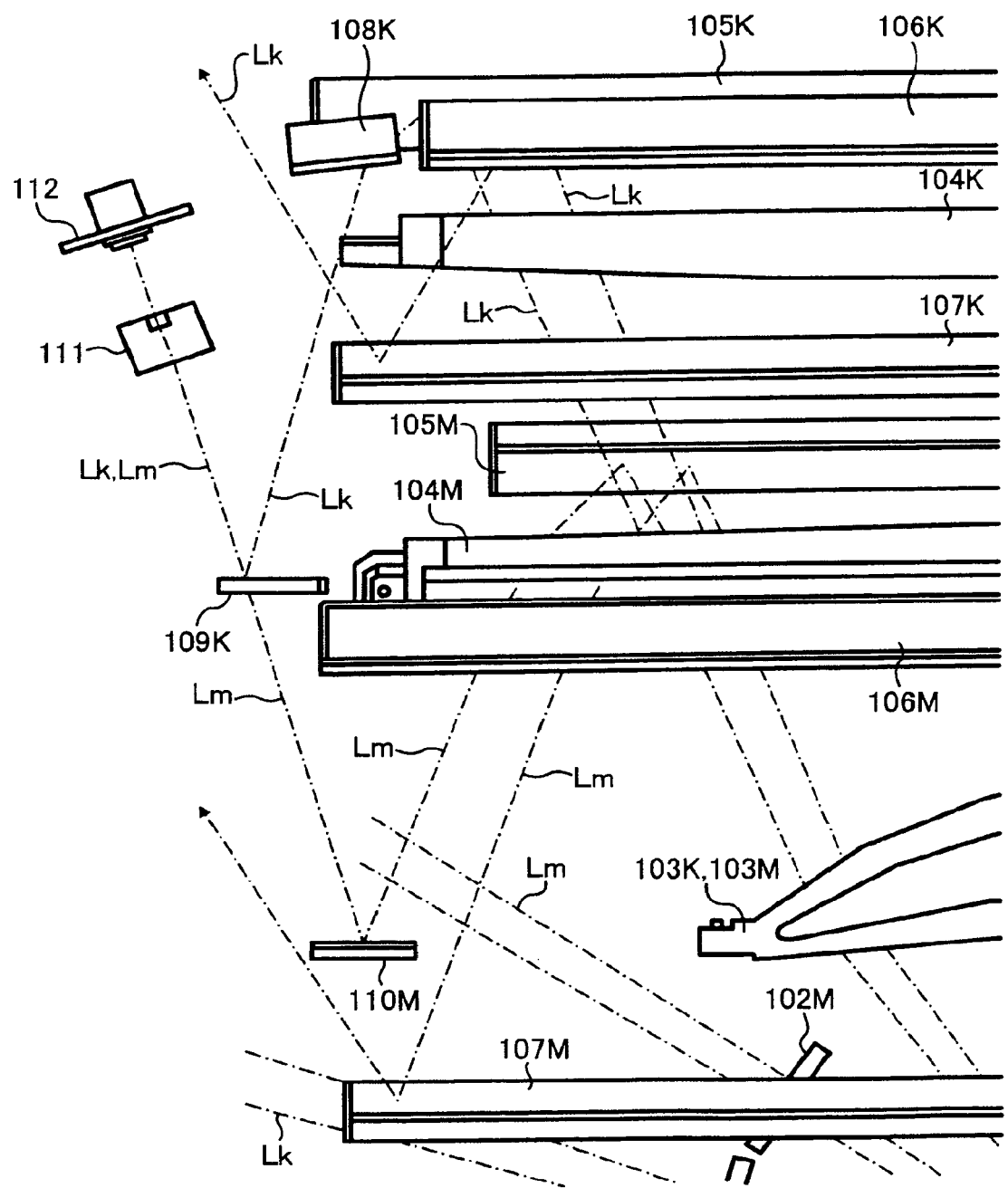
FIG. 7 is a plan view of left-side sections of these optical systems, as viewed from right above.
Figure 8:
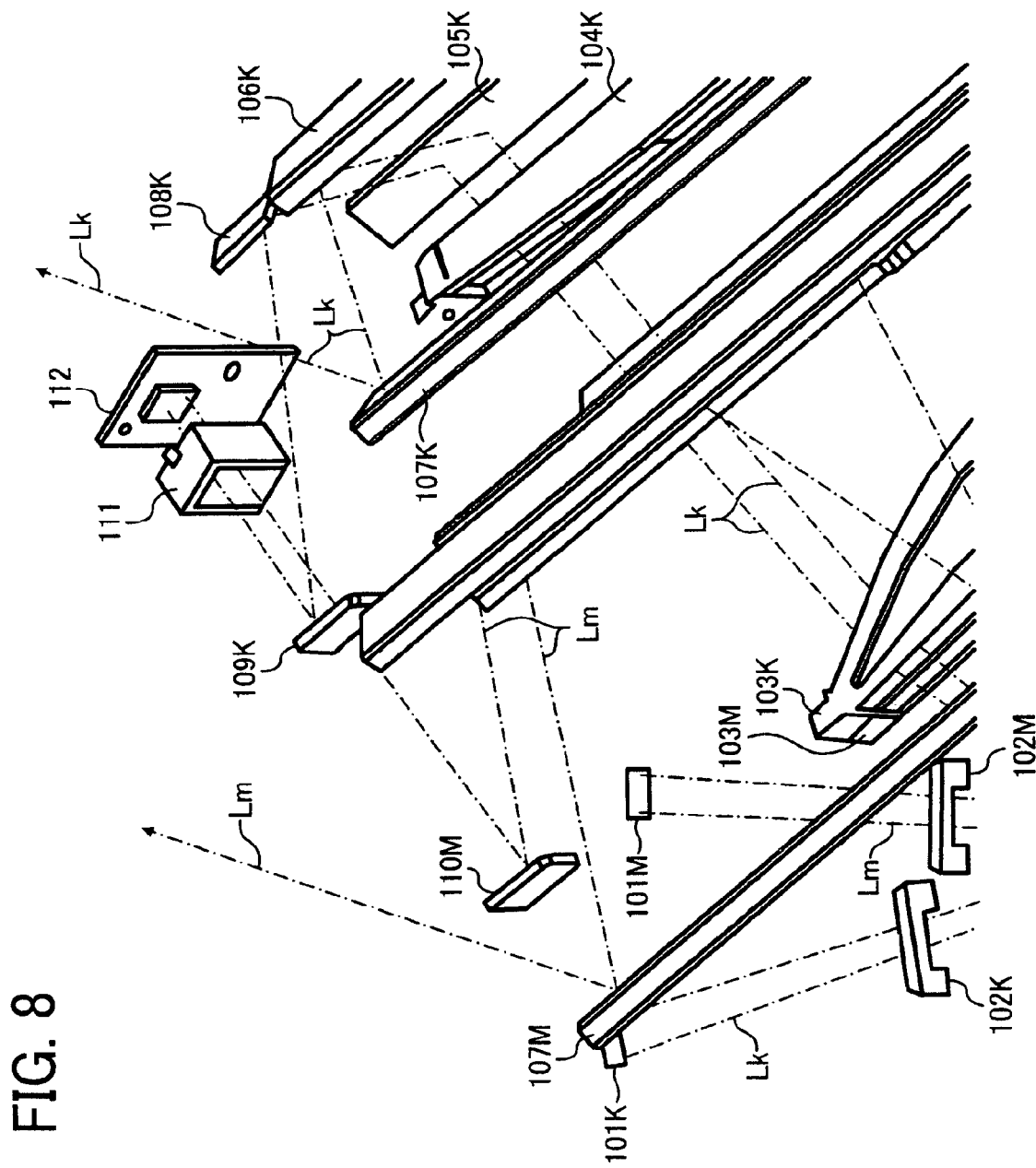
FIG. 8 is a perspective view of these optical systems, as viewed from a photoconductor for C, without depicting the left-side section of the optical systems.
Figure 9:
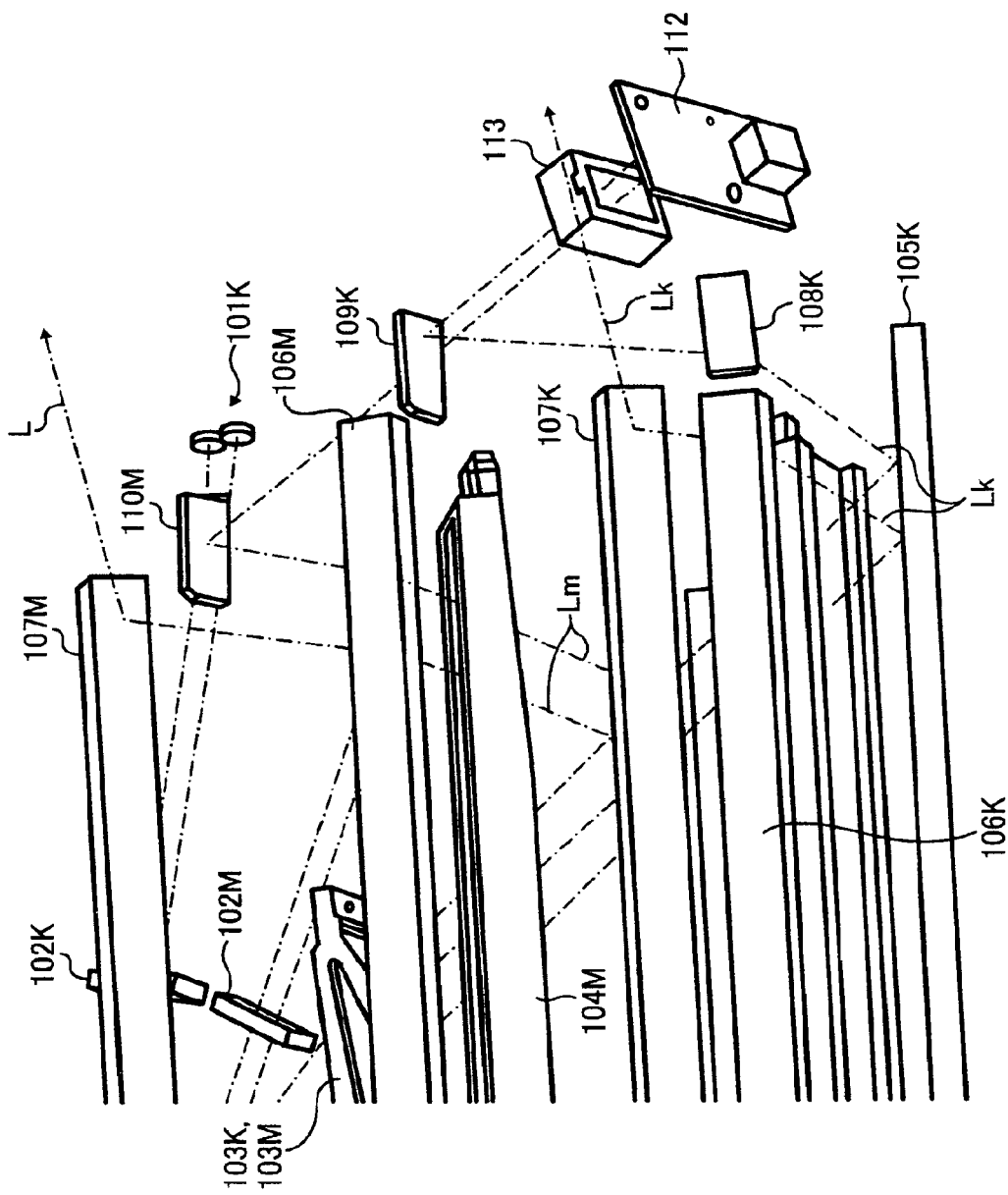
FIG. 9 is a perspective view of these optical systems, as viewed from a photoconductor for K, without depicting the left-side section of the optical systems.

FIG. 6 is a perspective view of the optical system for M and the optical system for K in the optical scanning device 100, as viewed from above. FIG. 7 is a plan view of the left-side sections of these optical systems, as viewed from right above. FIG. 8 is a perspective view of these optical systems, as viewed from the photoconductor for C, not depicting the left-side section of the optical systems. FIG. 9 is a perspective view of these optical systems, as viewed from the photoconductor for K, not depicting the left-side section of these optical systems.

As shown in these figures, the laser beam Lk emitted from the laser diode of the laser oscillator 101K for K is deflected by the upper polygon mirror 151 that rotates clockwise. Thus deflected, the laser beam Lk moves on the surfaces of the reflection mirrors (105K, 106K, and 107K), from the left to the right in the lengthwise direction of these mirrors (the main-scanning direction). When the beam reaches a position near the right side panel (not shown) of the printer housing, it is reflected by the next reflecting face of the upper polygon mirror 151. The beam spot moves at once in the main-scanning direction, from a position near the right side panel to a position near the left side panel. The beam spot then starts moving from the left to the right, in the lengthwise direction of the mirrors.

Immediately after the spot of the laser beam Lk moves from one reflecting face of the upper polygon mirror to the next reflecting face thereof, the spot exits on the left of the left end of the second reflection mirror 106K. When the laser beam Lk for K moves from the position toward the right for some distance, it is reflected on the surface of the second reflection mirror 106K.

On the left side of the second reflection mirror 106K for K, a left-front sync-detecting mirror 108K for K is arranged. The left-front sync-detecting mirror 108K reflects the laser beam Lk for K moving on its surface toward the second reflection mirror 106K for K, immediately after the spot of the laser beam Lk moves from one reflecting face of the upper polygon mirror 151 to the next reflecting face thereof. The laser beam Lk then moves toward a left-rear sync-detecting mirror 109K for K and is reflected on the surface of the left-rear sync-detecting mirror 109K. The laser beam Lk then passes through a left-condensing lens 111 for KM and is received by a left light-receiving sensor 112 for KM. The left light-receiving sensor 112 generates a left sync signal for the laser beam Lk for K.

On the right side of the first reflection mirror 105K for K, a right sync-detecting mirror 113K for K is arranged. The laser beam Lk moves on the surface of the first reflection mirror 105K for K from the left to the right in the lengthwise direction of the first reflection mirror 105K. Eventually, it further moves to the right from the right end of the first reflection mirror 105K. The right sync-detecting mirror 113K, which is located on the right side of the right end of the first reflection mirror 105K for K, then reflects the laser beam Lk for K. The laser beam Lk then passes through a right-condensing lens 114 for KM and is received by a right light-receiving sensor 115 for KM. The right light-receiving sensor 115 generates a right sync signal for the laser beam Lk for K.

On the other hand, the laser bean Lm for M, emitted from the laser diode of the laser oscillator 101M for M is deflected by the lower polygon mirror 152 that rotates clockwise. The laser beam Lm thus reflected moves on the surfaces of the reflection mirrors (105M, 106M, and 107M) from the left to the right in the same way as the laser beam Lk for K in the lengthwise direction of the reflection mirrors. The laser beam Lm moves again from the left to the right.

A left sync-detecting mirror 110M for M is arranged on the left side of the third reflection mirror 107M for M and on an oblique line. Immediately after the spot of the laser beam Lm moves from one reflecting face of the lower polygon mirror 152 to the next reflecting face thereof, the spot of the laser beam Lm for M lies on the left sync-detecting mirror 110M. The laser beam Lm is then reflected on the surface of the left sync-detecting mirror 110M, passes through the left-condensing lens 111 for KM, and is received by the left light-receiving sensor 112 for KM. The left light-receiving sensor 112 generates a left sync signal for the laser bean Lm for M.

A right-front sync-detecting mirror 116M for M is arranged on the right side of the third reflection mirror 107M for M and on an oblique line. The laser beam Lm for M, which moves on the surface of the third reflection mirror 107M from the left to the right in the lengthwise direction thereof eventually leaves the end of the third reflection mirror 107M. The laser beam Lm is then reflected on the surface of the right-front sync-detecting mirror 116M. Further, the laser beam Lm is reflected on the surface of a right-rear sync detecting mirror 117M for M. The laser beam Lm then passes through the right-condensing lens 114 for KM and is received by the right light-receiving sensor 115 for KM. The right light-receiving sensor 115 generates a right sync signal for the laser beam Lm or M.

Although not shown or explained in detail, in the optical system for C, a right sync signal and a left sync signal are generated for the laser beam Lc for C, in the same way as in the optical system for M. Also in the optical system for Y, a right sync signal and a left sync signal for the laser beam Ly are generated in the same way as in the optical system for K. The optical writing circuit that includes an application specific integrated circuit (ASIC) and the like adjusts the timing of driving the laser oscillators 101Y, 101C, 101M, and 101K for images of different colors. This minimizes the displacement of visible images of different colors, at the primary transfer nips.

In this example of the printer, laser beams are condensed to have a diameter of about 48 micrometers in the scanning direction and about 52 micrometers in the direction at right angles to the scanning direction before they are applied to each photoconductor, so that an image having resolution of 600 dots per inch (dpi) can be formed. A multi-beam including two laser beams is emitted for one shot, and the two laser beams overlap each other at one end. Hence, the multi-beam forms a beam spot of 85 micrometers to 90 micrometers wide in the main-scanning direction.

Furthermore, in this example of the printer, the four light-receiving sensors are of the type whose output voltage decreases from 5 Volts to 1 Volt when it receives light. The sync-detecting voltage range is set to 1.6 Volts or less in these light-receiving sensors.

Moreover, in this example of the printer, each laser beam (multi-beam) is repeatedly applied, on and off, at extremely short intervals so that dots can be distinctly formed in the axial direction of each photoconductor (the main-scanning direction), in any image region. Outside any image region, however, the laser beam is applied continuously. At the moment a sync signal is generated, the application of each laser beam is stopped. More precisely, the application of the laser beam is stopped at the moment the laser beam reaches a position near the rear end of the scanning line on the light-receiving surface if the sync signal is detected when the laser beam lies at a position which is on the light-receiving surface of the light-receiving sensor and which is appropriate in the scanning direction in any image region.

As explained above, the optical scanning device 100 includes the left light-receiving sensor 112 for KM and the right light-receiving sensor 115 for KM, which are used as light-receiving sensors, i.e., light-receiving units, in the optical system for K and the optical system for M. The optical scanning device 100 further includes a left light-receiving sensor for YC and a right light-receiving sensor for Y optical system and the optical systems for C, although any reference numerals are not designated in FIGS. 6 to 9. Thus, the optical scanning device 100 includes four light-receiving sensors in all. In this printer, scanning beams are applied to the four light-receiving sensors at the same incident angle with respect to the scanning line that extends in the scanning direction on the light-receiving surface of each light-receiving sensor (Hereinafter, this incident angle will be referred to as scanning-line incident angle $\theta 1$). Therefore, the sync signals for Y, C, M, and K are prevented from being detected at different times as they will if the light beams are applied at different incident angles to the light-receiving sensors. This minimizes the displacement of visible images of different colors on the transfer paper P.

In any printer of multi-beam type like this printer, the position where the laser beams constituting each multi-beam slightly differs in terms of the position where each reaches the light-receiving surface of any light-receiving sensor. Consequently, they slightly differ in terms of scanning-line incident angle $\theta 1$. Nonetheless, the scanning-line incident angle $\theta 1$ of each multi-beam can be, as a whole, the same as that of any other multi-beam. Whether the scanning-line incident angle $\theta 1$ of one multi-beam is equal to that of any other multi-beam can be determined as follows. That is, it suffices to determine the angle at which a specific line intersects with the light-receiving sensor, the specific line bisecting the angle between the axes of two laser beams that are, respectively, most upstream and downstream of the scanning line, with respect to the center of the spot formed by the multi-beam on the light-receiving surface of the light-receiving sensor. This angle can be regarded as the scanning-line incident angle $\theta 1$ for the multi-beam as a whole.

According to the present invention, the scanning-line incident angle $\theta 1$ and the orthogonal, scanning-line incident angle $\theta 2$, which will be explained later, can have an effective-value range each, which can be expressed as an integer. Therefore, the angles $\theta 1$ and $\theta 2$ can be identical if they are rounded to the decimal point.

Figure 10:
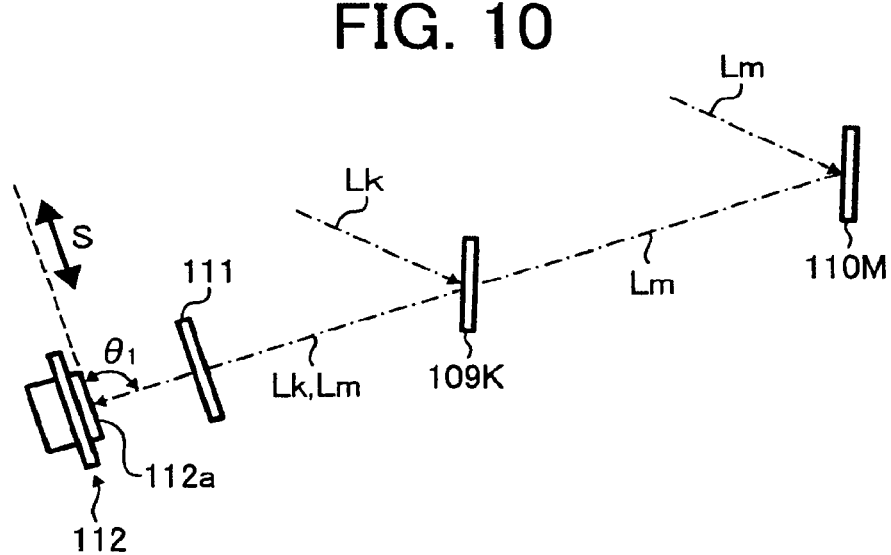
FIG. 10 is an enlarged schematic diagram of how a laser beam is applied to a left light-receiving sensor for KM used in the optical scanning device, as viewed from right above the main unit of the printer.

FIG. 10 is an enlarged schematic diagram of how a laser beam is applied to a left light-receiving sensor for KM used in the optical scanning device, as viewed from right above the main unit of the printer. As shown in FIG. 10, the laser beam Lk for K, which has been reflected by the left-rear sync-detecting mirror 109K for K, passes through the right-condensing lens 114 for KM and reaches a light-receiving surface 112a of the left light-receiving sensor 112 for KM. At this time, the laser beam Lk is applied to at the scanning-line incident angle θ1 of 90° to the scanning direction, i.e., the direction of arrow S shown in FIG. 10. In FIG. 10, only the laser beam applied to the left light-receiving sensor 112 is shown. Nevertheless, other laser beams are applied at the scanning-line incident angle θ1 of 90° to also the right light-receiving sensor 115 for KM, the left light-receiving sensor for YC, and the right light-receiving sensor for YC. Since the laser beams are applied to these light-receiving sensors at the same scanning-line incident angle θ1 of 90°, the amount of light received at each light-receiving sensor can be increased to a maximum. Thus, each light-receiving sensor can quickly detect any laser beam applied to it, even if it is a relatively inexpensive one having a low response. In FIG. 10, the laser beam Lm for M moves below the laser beam Lk for K in the vertical direction. Therefore, the laser beams Lm and Lk do not interfere with each other.

Each laser beam (multi-beam) is deflected to the left to the right, and vice versa, around the shaft of the polygon motor. Hence, in a micro level measurement, the scanning-line incident angle θ1 at which the beam is applied to one end of the light-receiving surface 112a differs a little from the scanning-line incident angle θ1 at which the beam is applied to the other end of the light-receiving surface 112a. In this printer, the scanning-line incident angle θ1 at one end of the light-receiving surface 112a is identical, and so is the angle θ1 at the other end of the light-receiving surface 112a, in all light-receiving sensors.

Figure 11:
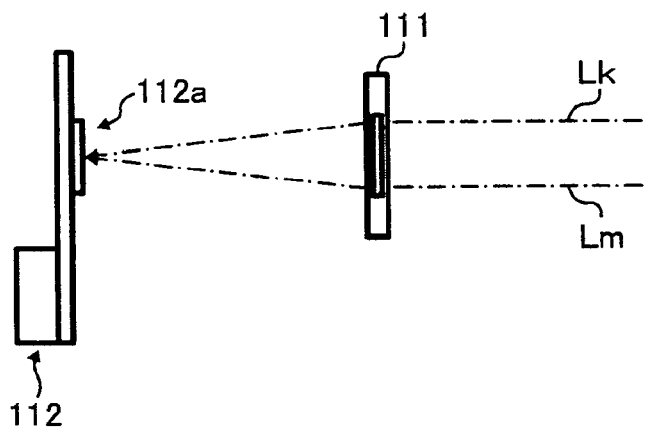
FIG. 11 is a schematic diagram of the left light-receiving sensor for KM, as viewed from a side.

The laser beams (multi-beams) for different colors can be detected by different light-receiving sensors. If so, however, a relatively large space is required to accommodate the light-receiving sensors. In view of this, each of the four light-receiving sensors receives two laser beams (two multi-beams) emitted respectively from two laser oscillators. To perform such light receiving, the optical paths of two laser beams that one light-receiving sensor is to receive are displaced from each other in a plane direction (hereinafter, "scanning orthogonal direction") that intersects at right angles with the scanning direction. As for the left light-receiving sensor 112 for KM, for example, the optical path of the laser beam Lk for K is set above that of the laser beam Lm for M as shown in FIG. 11. In this configuration, one light-receiving sensor receives two laser beams (two multi-beams), whereby the space is saved as compared to the case that all laser beams are detected by different light-receiving sensors, respectively.

As explained above, to make one light-receiving sensor receive two or more laser beams, the optical paths of these beams must be displaced from one another in the scanning orthogonal direction, in order to prevent the laser beams from interfering with one another. If the optical paths are so displaced, the size of the light-receiving sensor should be relatively increased in the scanning orthogonal direction, so that the sensor can reliably receive the laser beams. The increase in the size of the light-receiving sensor inevitably hinders the space saving and results in the increase in the manufacturing cost of the sensor. In view of this, a condensing lens (e.g., the left-condensing lens 111 for KM) is arranged immediately before each light-receiving sensor in this printer, to condense the two beams in the same direction. Thus, two beams are applied at the same position in the scanning orthogonal direction on the light-receiving surface of the light-receiving sensor. This can suppress the increase in the size of the light-receiving sensor and the increase in the manufacturing cost thereof.

In this example of the printer, the condensing lens causes two laser beams (two multi-beams) applied at the same position in the scanning orthogonal direction. Notwithstanding this, the two beams will not be focused at one point, for the following reason. In this printer, the four toner images must be synchronized respectively at four primary transfer nips that are arranged in the sheet-feeding direction, and the laser beams should therefore be different in scanning phase. To make the laser beams differ in scanning phase, the two laser beams are applied to the light-receiving surface at different timings.

To reduce the increase in the size of the light-receiving sensor, two condensing lenses can be provided for the two laser beams (two multi-beams), respectively, so that these laser beams can be applied at the same position or two close positions in the scanning orthogonal direction, on the light-receiving surface of the light-receiving sensor. If two condensing lenses are provided, however, the number of lenses used will increase, inevitably making the apparatus complex in structure. In view of this, it is configured that one condensing lens condenses the two laser beams.

If the condensing lens is one that condenses the beams in the scanning direction, it can greatly change the diameters of the beams as the beams are moved in the scanning direction. In this case, it will be difficult for the light-receiving sensor to accomplish reliable detection of beams that have stable intensity. Consequently, the timing of detecting the beams may deviate. Thus, in this printer, the pre-light-reception condensing sensor is one that condenses two scanning beam in only the direction in which the beams are arranged. The condensing lens of this type can solves the problem mentioned above. Note that a lens that condenses beams in the main-scanning direction changes the diameters of the beams due to, for example, the changes of temperature ambient to the lens, the thermal deformation of the lens, or the lens surface distorted from the ideal surface, because of process errors.

The laser beams for different colors can be detected by different light-receiving lenses, respectively. In this case, however, a relatively large space is required to accommodate the light-receiving sensors. In view of this, each of the four light-receiving sensors receives two laser beams (two multi-beams) emitted respectively from two laser oscillators. To achieve such light receiving, the optical paths of two laser beams that one light-receiving sensor is to receive are displaced from each other in the scanning orthogonal direction. In this configuration, one light-receiving sensor receives two laser beams, whereby the space is saved as compared to the case that all laser beams are detected by different light-receiving sensors, respectively.

Generally, a light-receiving element (photo IC) mounted on a laser oscillator has a response that changes according to the amount of light applied to it. The smaller the amount of light, the lower the response will be. To acquire an ideal response characteristic, the light-receiving element can have a circuit constant that corresponds to the amount of light received. If the two laser beams (two multi-beams) received by one light-receiving sensor differ in amount, the light-receiving element mounted on the light-receiving sensor cannot have an optimal circuit constant. Consequently, the timing of detecting one beam will deviate from the timing of detecting the other beam.

A major reason for the difference in amount between the two beams (two multi-beams) on the light-receiving surface of the light-receiving sensor that has received the two beams can be the difference in the number of times the beams are reflected by the reflection mirrors, or the difference in the loss of light, caused by repeated reflections. Thus, in this printer, the two laser beams are reflected the same number of times, while traveling from the laser oscillators to the light-receiving sensor. For example, the laser beams Lk for K and the laser beam Lm for M are reflected by three reflection mirrors before they reach the left light-receiving sensor 112 for KM. More specifically, the laser beam Lk for K is reflected by three reflecting mirrors, i.e., the first reflection mirror 105K for K, the left-front sync-detecting mirror 108K for K, and the left-rear sync-detecting mirror 109K for K. The laser beam Lm for M is also reflected by three reflection mirrors, i.e., the first reflection mirror 105M, the second reflection mirror 106M for M, and the left sync-detecting mirror 110M.

Figure 12:
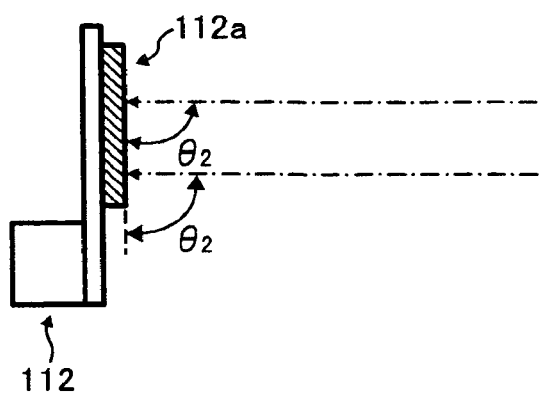
FIG. 12 is a schematic diagram of left light-receiving sensors for KM used in a modified apparatus, as viewed from the side.

In a modification example of the printer according to the present embodiment, the four light-receiving sensors include no condensing lenses. With this configuration, two laser beams are applied on the light-receiving surface of each light-receiving sensor, as shown in FIG. 12, at two positions that are relatively remote from each other in the scanning orthogonal direction. Therefore, the size of the sensor needs to be increased in the scanning orthogonal direction. This is indeed disadvantageous, but brings forth the following advantage. Since the two laser beams (two multi-beams) are not condensed in the scanning orthogonal direction immediately before the light-receiving sensor, their incident angle (hereinafter, "scanning-orthogonal incident angle") can be set to 0° to the scanning orthogonal direction (Hereinafter, this angle will be referred to as scanning-orthogonal incident angle). Hence, the amount of light that the light-receiving sensor receives in the scanning orthogonal direction can be maximized. The sensor can therefore quickly detect any laser beam applied to it, even if it is a relatively inexpensive one having has a low response.

Figure 13:
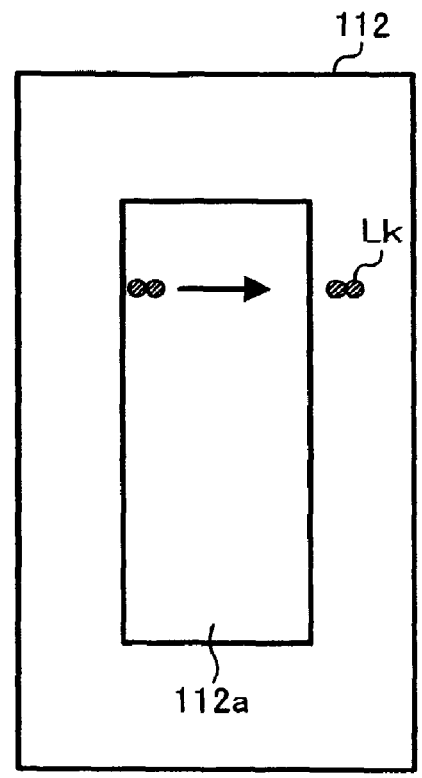
FIG. 13 is a schematic front view of the left light-receiving sensors for KM, and laser-beam spots for K.

Furthermore, in the modification example of the printer according to the present embodiment, the scanning beams applied to the four light-receiving sensors are condensed at such points that each beam forms a beam spot that has a diameter equal to the smallest diameter the spot can have on the corresponding photoconductor. That is, in each optical system for one color, the optical path of the laser beam emitted from the laser oscillator and reaching the light-receiving sensor is as long as the optical path of a laser beam that forms a beam spot of a minimum diameter at a specific scanning position on the photoconductor. Therefore, as shown in FIG. 13, the laser beams (the beams constituting a multi-beam) are condensed to have a diameter similar to that of a beam spot it will form and applied receiving surface of the photoconductor. In this configuration, the laser beams are applied to the light-receiving sensor, while being condensed to have a diameter almost equal to the diameter of the smallest beam spot that can be formed on the surface of the photoconductor. The amount of light the light-receiving sensor receives is thereby increased in both the scanning direction and the scanning orthogonal direction. This enables the light-receiving sensor to detect laser beams immediately even if the sensor is relatively inexpensive and has a low response.

Figure 14:
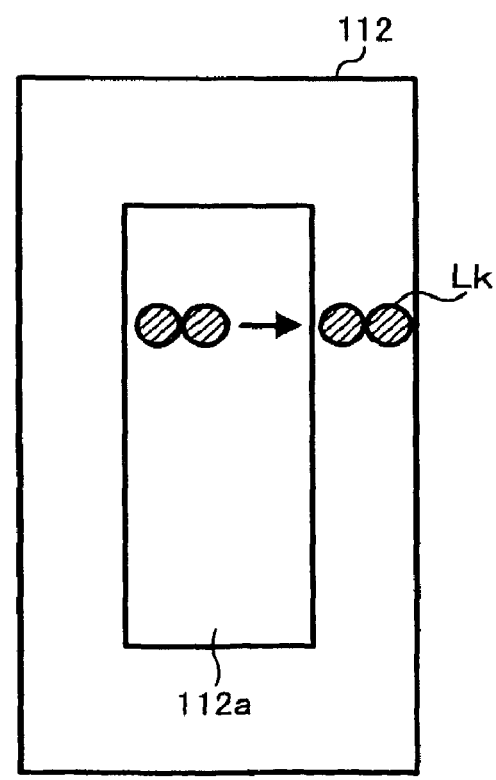
FIG. 14 is a schematic front view of a left light-receiving sensor for KM in a comparative example, depicting with laser-beam spots for K.
Figure 15:
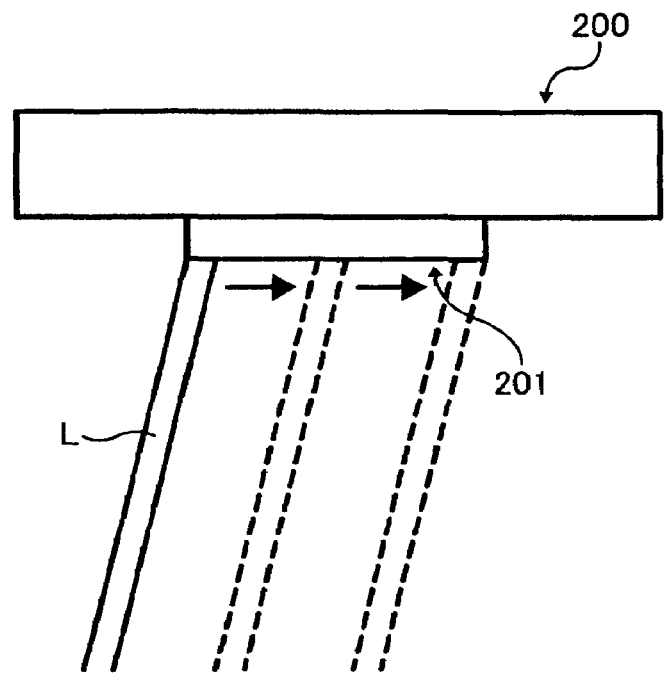
FIG. 15 is a schematic plan view of an ordinary light-receiving sensor and a laser beam received thereby.
Figure 16:
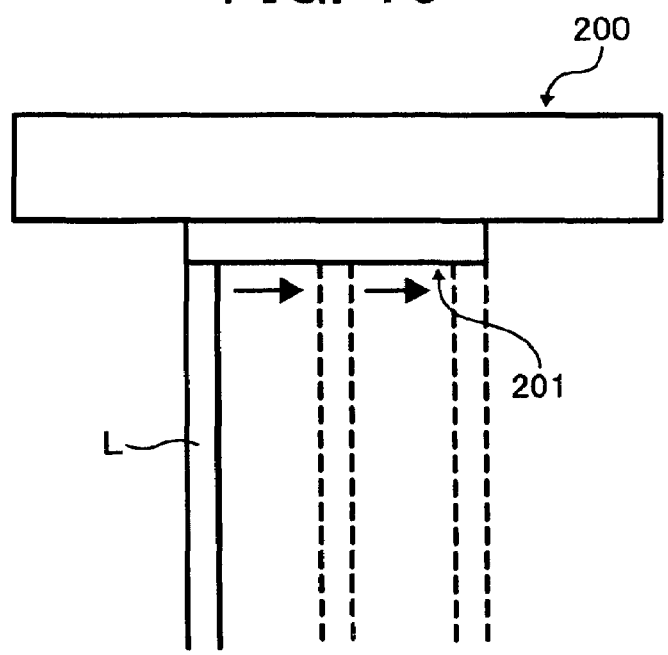
FIG. 16 is a schematic plan view of a laser beam applied to the light-receiving sensor at a perpendicular angle $\theta 1$ with respect to a scanning line.
Figure 17:
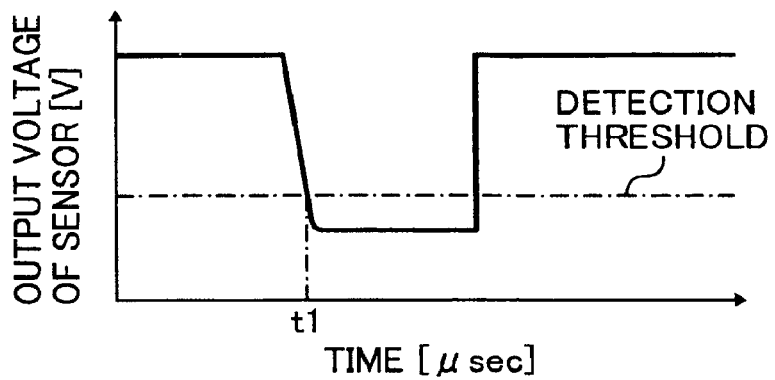
FIG. 17 is a graph of an output-voltage characteristic that the light-receiving sensor exhibits when a laser beam is applied to the light-receiving sensor, at a perpendicular angle $\theta 1$ with respect to the scanning line.
Figure 18:
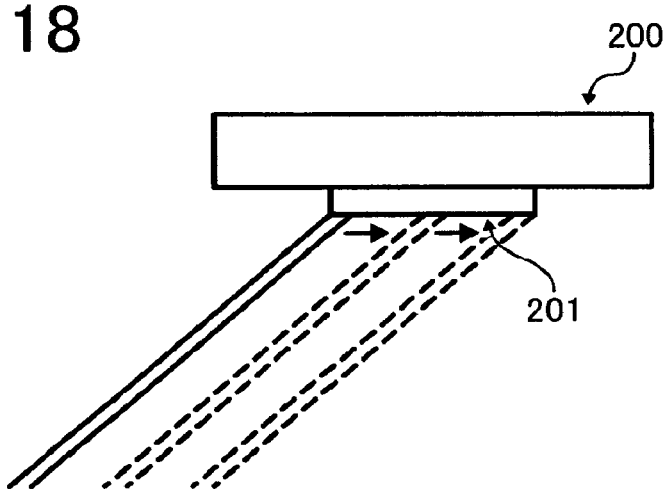
FIG. 18 is a schematic plan view of a laser beam applied to the light-receiving sensor at an acute angle $\theta 1$ with respect to the scanning line.
Figure 19:
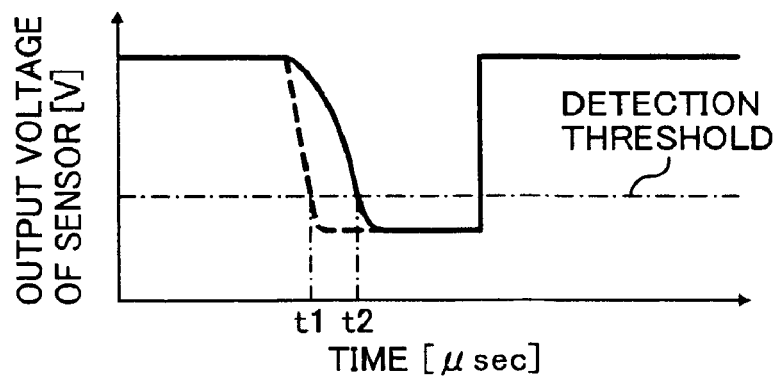
FIG. 19 is a graph of an output-voltage characteristic that the light-receiving sensor exhibits when a laser beam is applied to the sensor, at an acute angle $\theta 1$ with respect to the scanning line.

By contrast, laser beams having a relatively large diameter can be applied as shown in FIG. 14. In this case, the amount of light the light-receiving sensor receives is small. Consequently, the sensor cannot quickly detect the laser beams unless it is an expensive one having a high response. If the sensor is an expensive one, the manufacturing cost of the apparatus increases.

Thus far explained is the optical scanning device 100 of the multi-beam type. Nonetheless, the present invention can be also applied to an optical scanning device of single-beam type, in which one laser beam is emitted and applied to each photoconductor.

According to the present embodiment, the scanning-line incident angle θ1 at which a beam is applied to a predetermined position on the light-receiving surface of any light-receiving sensor used. Hence, any light-receiving sensor used can quickly detect the beam applied to it, even if it is relatively inexpensive and has a low response.

Furthermore, according to the present embodiment, each light-receiving sensor receives two scanning beams emitted from two laser oscillators, respectively. The space can therefore be greatly saved unlike the case that all laser beams (multi-beams) are detected by different light-receiving sensors, respectively.

According to the modification of the present embodiment, the orthogonal, scanning-line incident angle θ2 at which scanning beams are applied with respect to a line orthogonal to the scanning line on any light-receiving sensor is set to 0°. The light-receiving sensor can therefore quickly detect the laser beam applied to it even if it is relatively inexpensive and has a low response.

Furthermore, according to the modification of the present embodiment, the four laser beams applied to the four light-receiving sensors have different focal lengths so that they can form beam spots having the same diameter as that of the smallest beam spot that can be formed on a scanning line on any photoconductor. In this configuration, the light-receiving sensors can quickly detect the laser beams applied to them, even if they are relatively inexpensive and have a low response.

According to the present embodiment, two laser beams (two multi-beams) received by one light-receiving sensor are condensed by a condensing lens (e.g., the left-condensing lens 111 for KM) in the scanning orthogonal direction. This suppresses the increase in the size and manufacturing cost of the light-receiving sensor. Further, since the two scanning beams condensed by one condensing lens, the space can be saved more than in case that two condensing lenses condense two scanning beams, respectively.

Furthermore, according to the present embodiment, each condensing lens used condenses the two incident laser beams (two multi-beams) only in the direction the two beams are arranged (the vertical direction in the embodiment). This prevents the timing of detecting one beam from deviating from the timing of detecting the other beam, which will otherwise take place since the scanning beams are condensed in the scanning direction.

Moreover, according to the present embodiment, the two laser beams (multi-beams) emitted from two laser oscillators, respectively, are reflected the same number of times before they reach the light-receiving sensors. This prevents the amount of light one sensor receives from differing from the amount of light the other sensor receives, unlike in the case that the beams are reflected different numbers of reflection mirrors and inevitably differ in loss of light amount. Thus, the light-receiving sensors can be set to circuit constants that are optimal to the two laser beams, respectively. The deviation of the timing of detecting one beam from the timing of detecting the other beam can therefore be suppressed.

According to an embodiment of the present invention, the light beams emitted from a plurality of light-beam emitting units are applied at the same incident angles to a scanning line that extends in the scanning direction on the light-receiving surfaces of the light-receiving units. The deviation of the timing of detecting one beam from the timing of detecting the other beam, due to the different incident angles, is thereby eliminated. The displacement of visible images on a transfer-recording medium can therefore be more suppressed than in the conventional image forming apparatus.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device, comprising:
a plurality of light-beam emitting units each of which emitting a light beam;
a deflecting unit that deflects the light beam emitted by each of the light-beam emitting units independently to scan surfaces of different bodies to be scanned; and
a plurality of light-receiving units each receiving the plurality of deflected light beams at a predetermined position in a direction of the deflection,
wherein the plurality of deflected light beams are emitted from different light-beam emitting units and are incident on one light-receiving unit, an incident angle of the plurality of deflected light beams on a light-receiving surface of the one light-receiving unit is set to be identical in a scanning surface formed by the beam scanned by the deflection unit, each of the plurality of deflected light beams scans the surfaces of corresponding different bodies to be scanned, each of the plurality of deflected light beams is, in a main-scanning surface, incident into the light-receiving unit with an angle of 90 degrees and is incident on a same straight line, and the plurality of light beams are, in a sub-scanning surface, incident into the light-receiving unit parallel to each other.

2. The optical scanning device according to claim 1, wherein
the incident angle is set to be perpendicular to the scanning line on the light-receiving surface.

3. The optical scanning device according to claim 2, wherein
a focal length of each of the deflected light beams is set such that a beam spot size of each of the deflected light beams is same as a smallest beam spot size that can be obtained on a scanning line of each of the bodies to be scanned for all of the light-receiving units.

4. The optical scanning device according to claim 1, wherein
two or more light beams emitted from different light-beam emitting units are incident on one light-receiving unit.

5. The optical scanning device according to claim 4, wherein
incident angles of the two or more light beams are set to be perpendicular to a scanning-orthogonal line that is perpendicular to the scanning line on the light-receiving surface.

6. The optical scanning device according to claim 4, further comprising:
a condensing lens that condenses each of the two or more light beams received by the one light-receiving unit in a direction of a surface perpendicular to a scanning direction.

7. The optical scanning device according to claim 6, wherein
the condensing lens has a condensing capability in a direction in which plural incident light beams are arranged.

8. The optical scanning device according to claim 4, wherein
number of reflection mirrors through which the light beam is routed from the light-beam emitting unit to the light-receiving unit is same for all of the two or more light beams received by the one light-receiving unit.

9. An image forming apparatus comprising:
a plurality of photoconductors for forming a latent image;
an optical scanning device that optically scans the photoconductors independently, to form latent images on the photoconductors;
a developing unit that develops the latent images formed on the photoconductors independently; and
a transfer unit that transfers visible images obtained by developing the latent images on the photoconductors to a transfer medium in a superimposing manner, wherein
the optical scanning device includes:
a plurality of light-beam emitting units each of which emitting a light beam;
a deflecting unit that deflects the light beam emitted by each of the light-beam emitting units independently to scan surfaces of different bodies to be scanned; and
a plurality of light-receiving units each receiving the plurality of deflected light beams at a predetermined position in a direction of the deflection,
wherein the plurality of deflected light beams are emitted from different light-beam emitting units and are incident on one light-receiving unit, an incident angle of the plurality of deflected light beams on a light-receiving surface of the one light-receiving unit is set to be identical in a scanning surface formed by the beam scanned by the deflection unit, each of the plurality of deflected light beams scans the surfaces of corresponding different bodies to be scanned, each of the plurality of deflected light beams is, in a main-scanning surface, incident into the light-receiving unit with an angle of 90 degrees and is incident on a same straight line, and the plurality of light beams are, in a sub-scanning surface, incident into the light-receiving unit parallel to each other.

* * * * *